(12) United States Patent
Casimir et al.

(10) Patent No.: US 9,553,524 B2
(45) Date of Patent: Jan. 24, 2017

(54) METHOD FOR CONVERTING ALTERNATING CURRENT INTO DIRECT CURRENT AND RELATED DEVICE

(71) Applicant: Labinal Power Systems, Blagnac (FR)

(72) Inventors: Roland Casimir, Saint Germain en Laye (FR); Vincent Giorgis, Saint Maur des Fosses (FR); Paul Giraud, Moissy-Cramayel (FR)

(73) Assignee: LABINAL POWER SYSTEMS, Blagnac (FR)

( * ) Notice: Subject to any disclaimer, the term of this patent is extended or adjusted under 35 U.S.C. 154(b) by 0 days.

(21) Appl. No.: 14/646,508

(22) PCT Filed: Nov. 26, 2013

(86) PCT No.: PCT/FR2013/052864
§ 371 (c)(1),
(2) Date: May 21, 2015

(87) PCT Pub. No.: WO2014/083276
PCT Pub. Date: Jun. 5, 2014

(65) Prior Publication Data
US 2015/0303822 A1  Oct. 22, 2015

(30) Foreign Application Priority Data
Nov. 27, 2012  (FR) ...................... 12 61287

(51) Int. Cl.
*H02M 7/217* (2006.01)
*H02M 7/04* (2006.01)
(Continued)

(52) U.S. Cl.
CPC ................. *H02M 7/04* (2013.01); *H02M 1/36* (2013.01); *H02M 7/219* (2013.01); *H02M 7/2173* (2013.01)

(58) Field of Classification Search
CPC ....... H02M 1/08; H02M 7/2173; H02M 7/219
(Continued)

(56) References Cited

U.S. PATENT DOCUMENTS

| 6,594,164 B2 * | 7/2003 | Suzuki ............... H02M 1/4233 363/129 |
| 2007/0216373 A1 * | 9/2007 | Smedley ............. H02J 3/1842 323/223 |

(Continued)

FOREIGN PATENT DOCUMENTS

| EP | 2 023 476 A2 | 2/2009 |
| JP | 2008-061322 A | 3/2008 |
| WO | 95/01670 A1 | 1/1995 |

OTHER PUBLICATIONS

Qu Bo et al., "A Study of Startup Inrush Current of Three-Phase Voltage Source PWM Rectifier with PI Controller" IEEE 6th International Power Electronics and Motion Control Conference, May 2009.

(Continued)

*Primary Examiner* — Jeffrey Sterrett
(74) *Attorney, Agent, or Firm* — Pearne & Gordon LLP

(57) ABSTRACT

The invention relates to a method for converting alternating current into direct current implemented by a conversion device that comprises a three-phase bridge in which at least one arm is comprised of a first switch and of a second switch mounted in series, with the method comprising a step of regulating the direct voltage output by the conversion device, characterized in that it comprises a transition step which precedes the regulation step, with the transition step comprising the formation of signals for controlling first and second switches capable of limiting the amplitude of the inrush currents when switching the conversion device to the alternative network.

6 Claims, 7 Drawing Sheets

(51) Int. Cl.
*H02M 1/36* (2007.01)
*H02M 7/219* (2006.01)

(58) Field of Classification Search
USPC .................................................. 363/44, 89
See application file for complete search history.

(56) References Cited

U.S. PATENT DOCUMENTS

| | | | | |
|---|---|---|---|---|
| 2011/0007531 | A1* | 1/2011 | Sakakibara | H02M 5/4585 363/37 |
| 2012/0300519 | A1* | 11/2012 | Clemmons | H02M 7/2173 363/127 |
| 2013/0091872 | A1* | 4/2013 | Hurych | H02M 1/081 62/56 |
| 2014/0362625 | A1* | 12/2014 | Mehringer | H02M 7/219 363/127 |
| 2015/0303822 | A1* | 10/2015 | Casimir | H02M 1/36 363/84 |
| 2016/0211740 | A1* | 7/2016 | Schueler | H02P 25/22 |

OTHER PUBLICATIONS

Search Report issued in French Patent Application No. FR 12 61287 dated Aug. 8, 2013.
International Search Report issued in Application No. PCT/FR2013/052864 dated Mar. 31, 2014.
Written Opinion issued in Application No. PCT/FR2013/052864 dated Mar. 31, 2014.

* cited by examiner

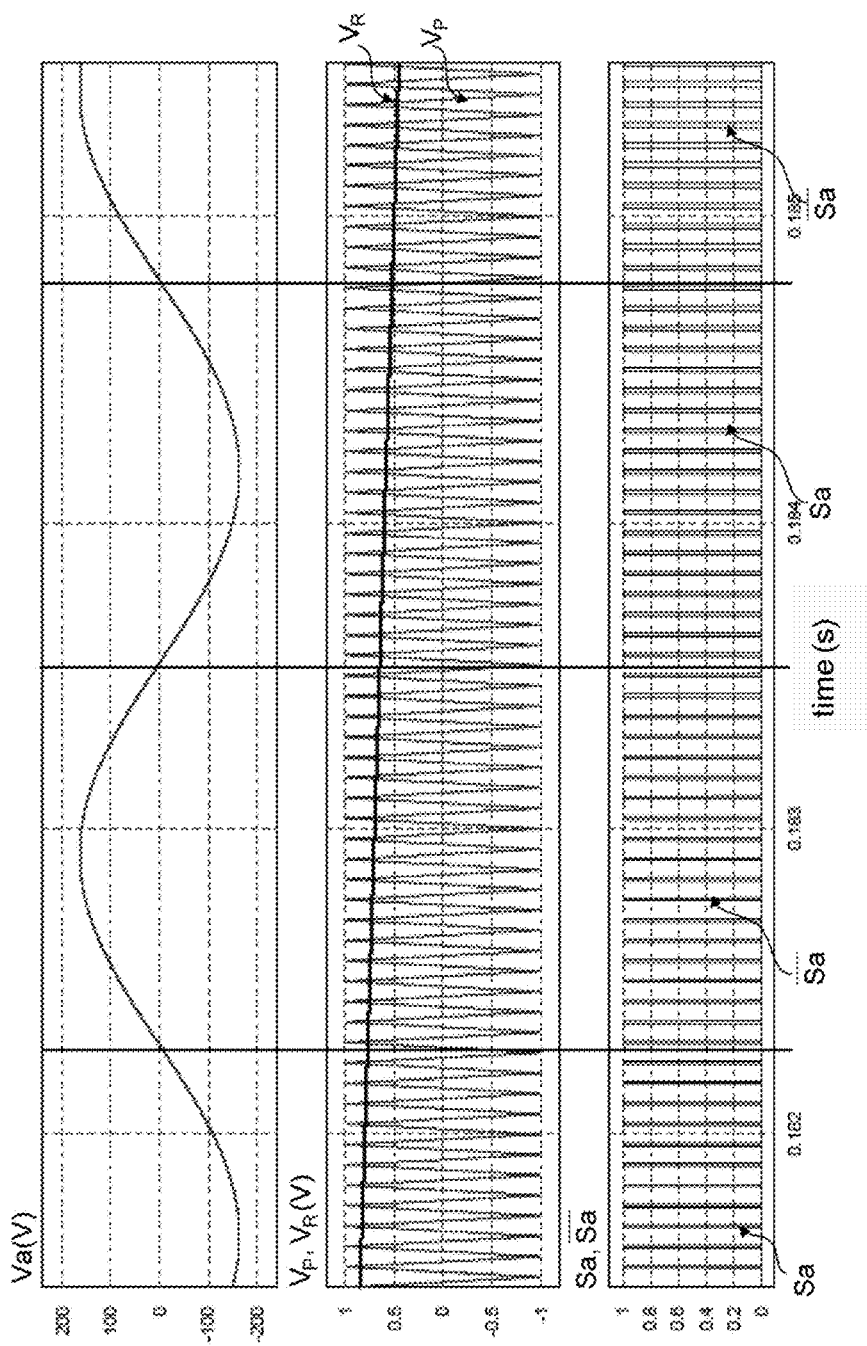

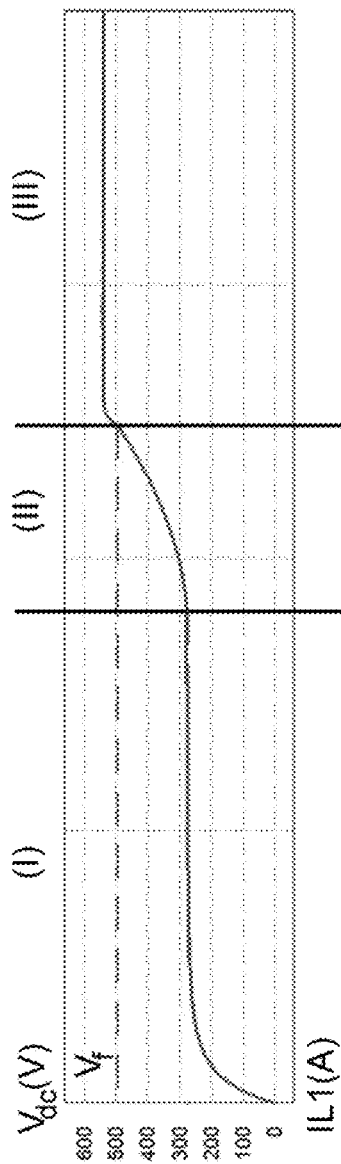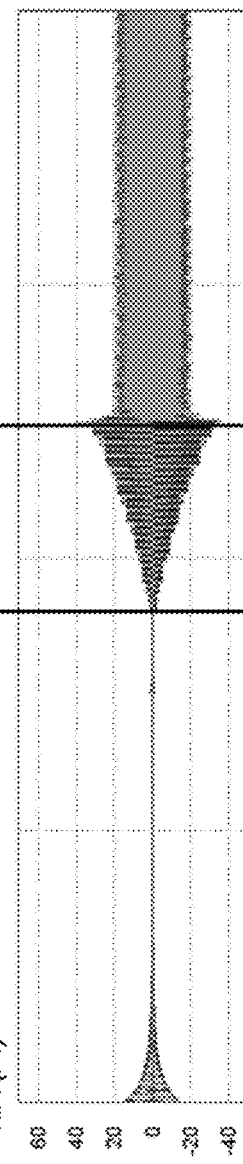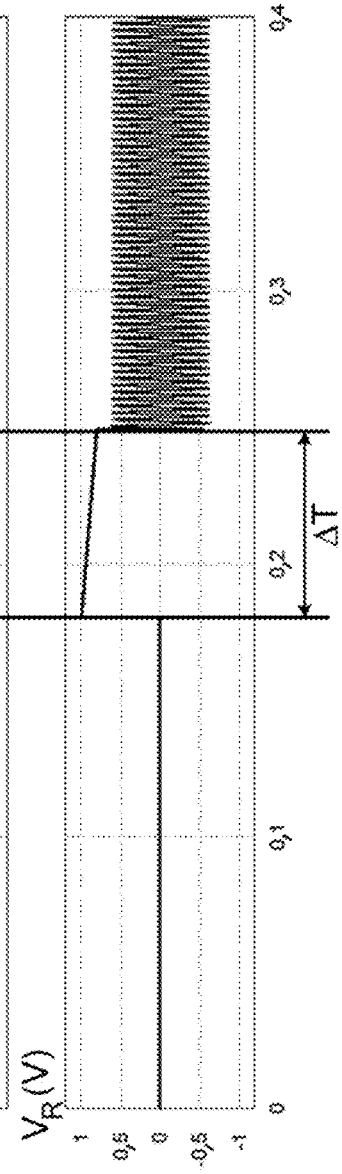

METHOD FOR CONVERTING ALTERNATING CURRENT INTO DIRECT CURRENT AND RELATED DEVICE

TECHNICAL FIELD AND PRIOR ART

The invention relates to a method for converting alternating current into direct current, more commonly called AC/DC conversion, and the related conversion device.

The invention applies, for example, to the electrical distribution for the power supply of loads of an aircraft. The converters that participate in such an electrical distribution first transform an alternative network into a direct network. The alternative network is, for example, a voltage network supplied by a generator external to the aircraft when the latter is on the ground. Using the direct network created as such, other converters, for example inverters, control the loads of the aircraft such as, for example, the starter for starting the auxiliary power unit located in the tail cone of the aircraft.

To date, the energy conversion mode used to generate the direct network operates in two successive steps, namely:
 a pre-load step during which an AC/DC conversion device is connected to the three-phase alternative network by the intermediary of resistors, and
 a step of regulating the output voltage in order to raise the latter to a desired value.

The pre-load resistors limit the inrush current that occurs on the alternative network when switching the converter to the network. During the pre-load, there is no regulation. The semiconductors that are part of the converter remain in blocked state and the converter is then equivalent to a three-phase diode bridge.

FIG. 1 shows a global architecture of the AC/DC conversion device of prior art and FIGS. 2A and 2B are detailed views of the device shown in FIG. 1.

The global architecture of the AC/DC conversion device comprises a block 1 of pre-load resistors, a block 2 for AC/DC conversion, a decoupling capacitor 3, a load 4 at the terminals of which the direct voltage output Vdc is applied, a control circuit 5, a set of self-induction coils $L_1$, $L_2$, $L_3$ with respective resistors $r_1$, $r_2$, $r_3$, a device $M_V$ for measuring alternating input voltages $V_a$, $V_b$, $V_c$, a device $M_c$ for measuring input currents $IL_1$, $IL_2$, $IL_3$ that flow through the respective self-induction coils $L_1$, $L_2$, $L_3$ and a device $M_{DC}$ for measuring the direct voltage output $V_{dc}$. The measurements output by the devices $M_V$, $M_C$ and $M_{DC}$ are transmitted to the control circuit 5, which outputs the settings CSG which are applied to the AC/DC conversion block 2.

FIG. 2A shows a detailed view of the block 1 of pre-load resistors. The block 1 comprises three resistors $R_1$, $R_2$, $R_3$ in series with three respective switches $K_{11}$, $K_{21}$, $K_{31}$, with the whole constituted of a resistor $R_i$ in series with a switch $K_{i1}$ (i=1, 2, 3) being mounted in parallel of a switch $K_{i2}$.

FIG. 2B shows a detailed view of the block 2 for AC/DC conversion. The block 2 comprises a three-phase bridge made of three arms in parallel, with each arm being made of two switches in series, with each switch being mounted in parallel of a free-wheeling diode. A first arm is formed from the switches $Z_1$, $Z_2$ and diodes $D_1$, $D_2$. A second arm is formed from switches $Z_3$, $Z_4$ and diodes $D_3$, $D_4$. A third arm is formed from switches $Z_5$, $Z_6$ and diodes $D_5$, $D_6$. Each switch $Z_j$ is provided with a control terminal $G_j$ (j=1, 2, ..., 6). Each arm has a middle point located between the two switches in series and whereon is applied a different alternating input voltage. The voltage $V_a$ is as such applied to the middle point of the switches $Z_1$, $Z_2$, the voltage $V_b$ to the middle point of switches $Z_3$, $Z_4$ and the voltage $V_c$ to the middle point of switches $Z_5$, $Z_6$. A capacitor K is mounted between the terminals where the output voltage $V_{dc}$ is taken.

During the pre-load phase, the switches $K_{i1}$ (i=1, 2, 3) are conductive and the switches $K_{i2}$ are in blocked state. The respective currents $IL_1$, $IL_2$, $IL_3$ then flow through the pre-load resistors $R_1$, $R_2$, $R_3$. The resistors $R_1$, $R_2$ and $R_3$ make it possible to limit the inrush current on the alternative network when switching the AC/DC converter block to the latter. During the entire pre-load step, the switches $Z_j$ are in blocked state. The output voltage $V_{dc}$ rises to a value for the pre-load end voltage that is theoretically proportional to the effective value of the input voltage. When the output voltage $V_{dc}$ reaches its theoretical value, the resistors $R_i$ (i=1, 2, 3) are short-circuited by the closing of the switches $K_{i2}$ (conductive state) and the regulation step is triggered. During the permanent state of the regulation step, the switches $Z_j$ are controlled according to the settings CSG in order to obtain the desired output voltage.

A disadvantage of this operating mode is the appearance of transient phenomena of the inrush current type at the beginning of the regulation of the output voltage. This has for harmful consequences to stress the power components (decrease in the reliability and saturation of the inductances) and to prevent compliance with standards and requirements to be kept concerning the quality of the network.

FIGS. 3 and 4 show the appearance of these transient phenomena. FIG. 3 shows the voltage $V_{dc}$ at the output of the converter and FIG. 4 shows the input currents $IL_i$ (i=1, 2, 3) associated with these transient phenomena. It appears in FIG. 4 that the inrush currents on the alternative network can reach, for example, 170 A during the transition between the pre-load step and the regulation step (instant $t_o$ in FIGS. 3 and 4). In the case of N converters in parallel, the inrush current on the input network is multiplied by N. This results, for example, in an inrush current that can reach 500 A (case with three converters in parallel). This is a real disadvantage.

The method of the invention does not have this disadvantage.

DISCLOSURE OF THE INVENTION

Indeed, the invention relates to a method for converting alternating current into direct current implemented by a conversion device that comprises a three-phase bridge able to convert into direct voltage at least one alternating input voltage, with the three-phase bridge comprising at least one arm made of a first switch and of a second switch mounted in series, with each switch having a control input able to control the opening or the closing of the switch, with the method comprising a step of regulating the direct voltage, characterised in that it comprises a transition step which precedes the regulation step, with the transition step comprising the formation, using the alternating input voltage, of a first signal applied to the control input of the first switch and of a second signal applied to the control input of the second switch, in such a way that:

a) during the negative alternations of the alternating input voltage, the first signal is a pulse signal of which the width of the successive pulses widens progressively as a function of time, which opens and closes the first switch, and the second signal is a continuous signal that keeps the second switch open, and b) during the positive alternations of the alternating input voltage, the first signal is a continuous signal that keeps open the first switch and the second signal is a pulse signal of which the width of the successive pulses widens progressively as a function of time, which opens and closes the second switch.

According to an additional characteristic of the method of conversion of the invention, the formation, using the alternating input voltage, of said first signal and of said second signal comprises:
- a generation of successive pulses of which the width widens progressively as a function of time,
- a formation, using the alternating input voltage, of a level 1 logic signal for the positive alternations of the alternating input voltage and of level 0 for the negative alternations of the alternating input voltage,
- an inversion of the logic signal in order to form an inverted logic signal,
- a formation of the first signal using a first logic AND circuit that receives on a first input said pulses and on a second input the logic level signal, and
- a formation of the second signal using a second logic AND circuit that receives on a first input said pulses and on a second input the inverted logic signal.

The invention also relates to a device for converting alternating current into direct current that comprises means able to implement the method of the invention.

BRIEF DESCRIPTION OF THE FIGURES

Other characteristics and advantages of the invention shall appear when reading a preferred embodiment made in reference to the annexed figures, among which:

FIGS. 7a, 7b and 7c show the formation of signals for controlling the AC/DC conversion device of the invention;

FIGS. 9a, 9b and 9c show the operation of the AC/DC conversion device of the invention under the effect of the control signals shown in FIGS. 7a-7c.

DETAILED DISCLOSURE OF PARTICULAR EMBODIMENTS OF THE INVENTION

Figure 1:
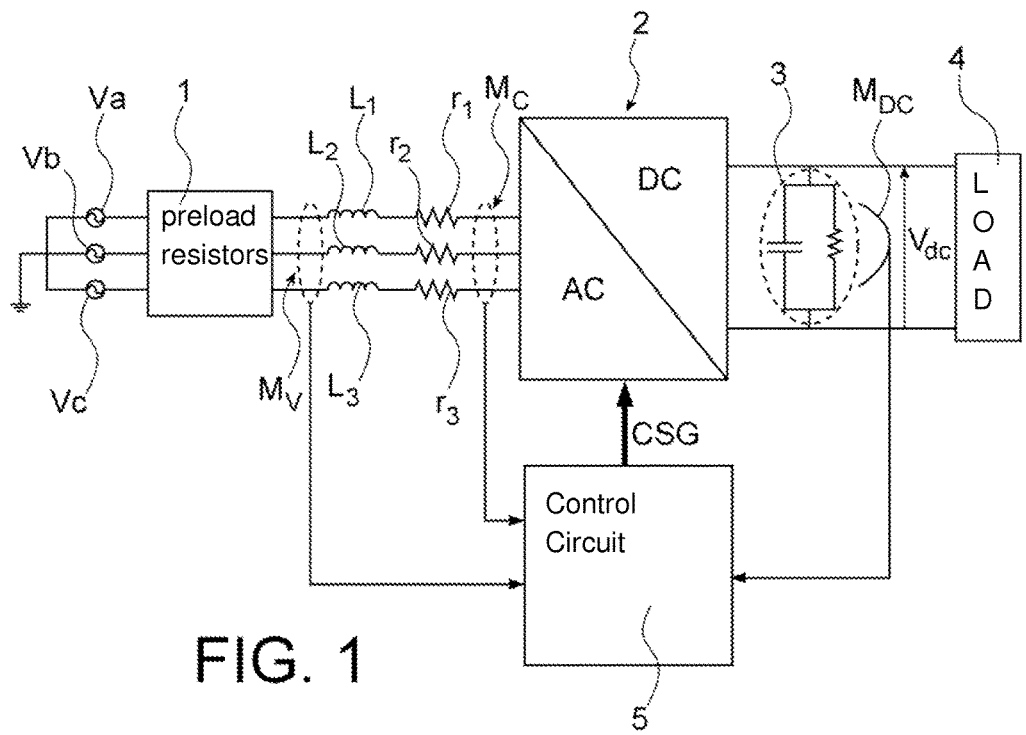
FIG. 1, already described, shows a global architecture of a AC/DC conversion device.
Figure 2A:
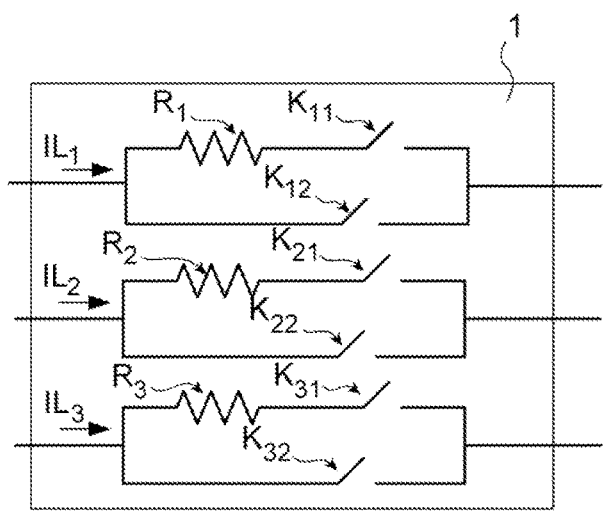
FIGS. 2A and 2B, already described, are detailed views of the device shown in FIG. 1.
Figure 2B:
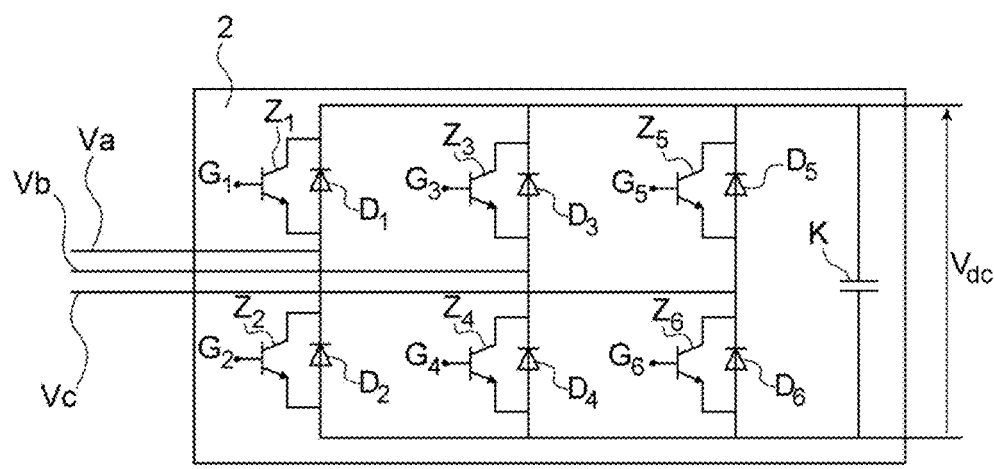
Figure 3:
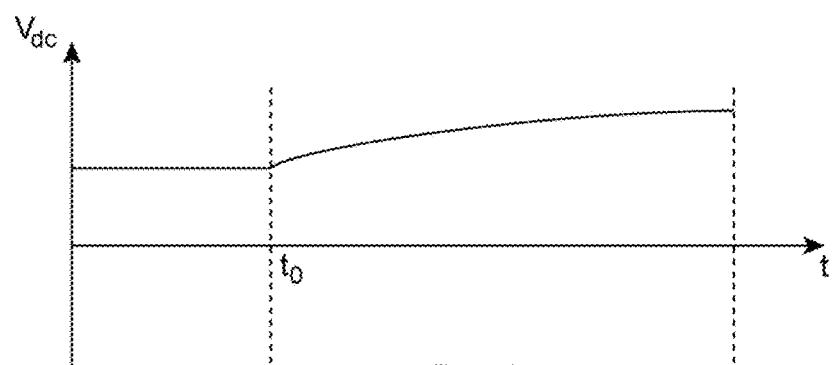
FIGS. 3 and 4, already described, show the transient phenomena that appear in an AC/DC converter of prior art during the transition between the pre-load step and the voltage regulation step.
Figure 4:
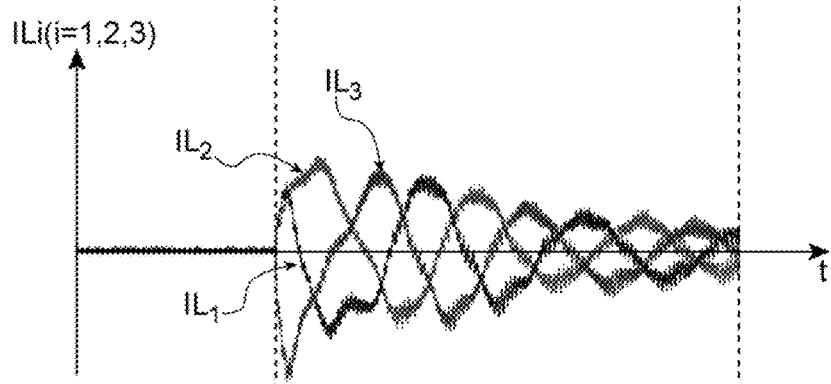
Figure 5:
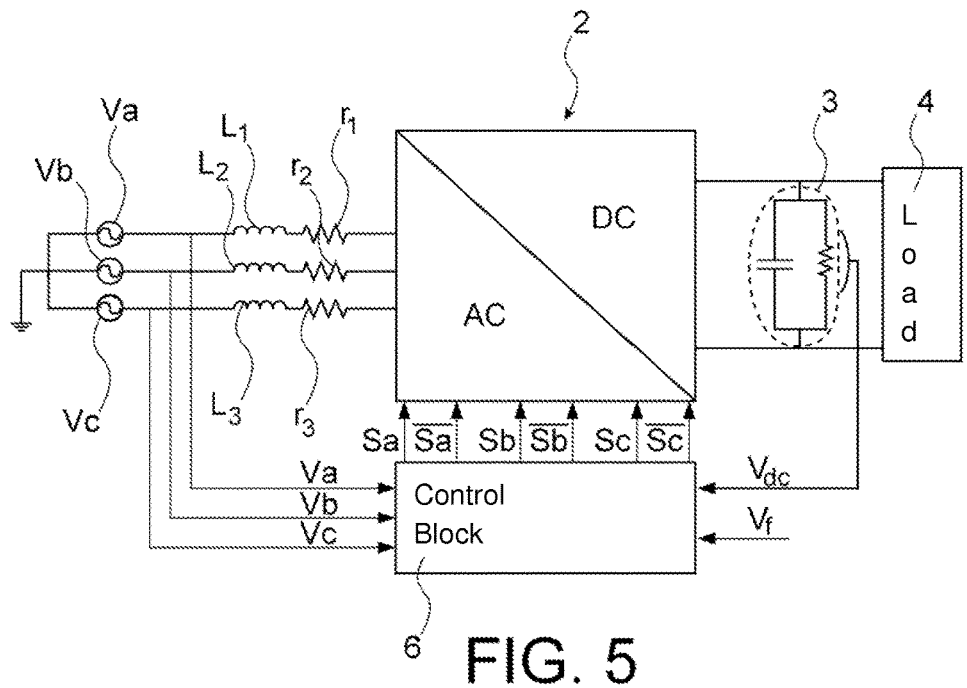
FIG. 5 shows an AC/DC converter able to implement the method of the invention.

FIG. 5 shows a converter of alternating current into direct current able to implement the method of conversion of the invention.

In addition to the self-induction coils $L_1$, $L_2$, $L_3$, of respective resistors $r_1$, $r_2$, $r_3$, the conversion block 2 and the capacitor 3, the AC/DC converter comprises a control circuit 6.

The method of conversion of the invention comprises a transition step between the pre-load step and the regulation step. It is the control circuit 6 that allows for the implementation of the transition step. The control circuit 6 is activated as soon as the pre-load step is terminated. The pre-load step terminates in a manner known per se, for example by timing or as soon as the direct voltage output reaches a predetermined threshold value.

As soon as it is activated, the control circuit 6 outputs control signals Sa, $\overline{Sa}$, Sb, $\overline{Sb}$, Sc, $\overline{Sc}$ which are applied, respectively, on the terminals $G_1$-$G_6$ of the switches $Z_1$-$Z_6$. The signals Sa and $\overline{Sa}$ are formed using the input voltage $V_a$. Likewise, the signals Sb and $\overline{Sb}$ are formed using the input voltage $V_b$ and the signals Sc and $\overline{Sc}$ are formed using the input voltage $V_c$. In order to avoid complicating FIG. 6, only the generation of the signals Sa and $\overline{Sa}$ using the input voltage $V_a$ is shown. However, in the framework of the invention, the control block also generates the signals Sb, $\overline{Sb}$ and Sc, $\overline{Sc}$ according to the same principle.

Figure 6:
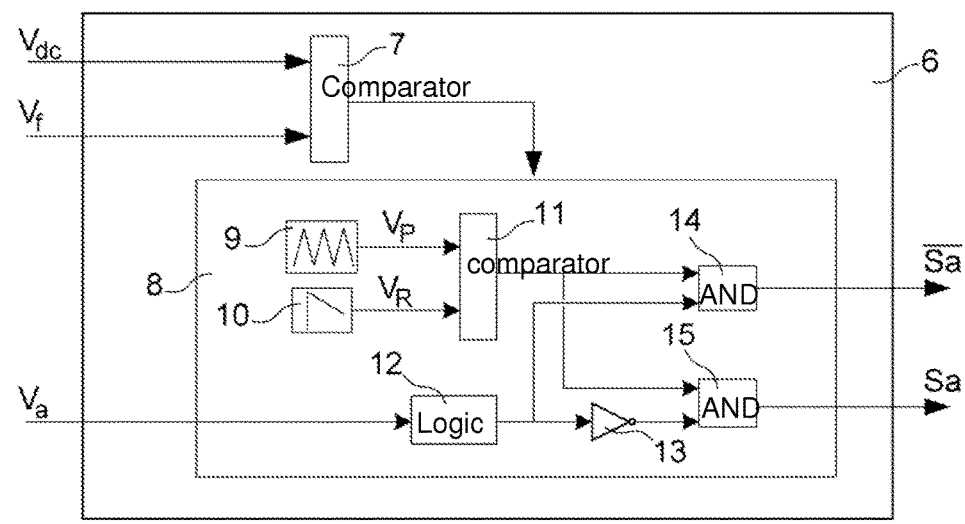
FIG. 6 is a detailed view of the AC/DC converter shown in FIG. 5.

FIG. 6 shows the control block 6 according to the preferred embodiment of the invention. The bloc 6 comprises a first comparator 7 and a control signal generation block 8.

The control signal generation block 8 comprises:
- a pulse width modulator made of a carrier signal Vp generator 9, a ramp signal $V_R$ generator 10 and a comparator 11,
- a logic circuit 12,
- an inverter circuit 13, and
- two logic AND circuits 14 and 15.

The logic circuit 12 receives on its input the alternating voltage $V_a$. The logic level at the output of the circuit 12 is equal to 1 when the voltage $V_a$ is positive (positive alternation) and to 0 when the voltage $V_a$ is negative (negative alternation). This logic level is applied to a first input of the AND circuit 14 and, after inversion by the inverter circuit 13, to a first input of the AND circuit 15, with the AND circuits 14 and 15 each receiving the signal output by the comparator 11, which receives, on a first input, the carrier signal Vp output by the generator 9 and, on a second input, the ramp signal $V_p$ output by the generator 10.

FIGS. 7a-7c show the formation of the control signals Sa, $\overline{Sa}$ which is operated by the block 8 using the input signal $V_a$.

FIG. 7a shows the alternating input voltage $V_a$. FIG. 7b shows, in the same mark, the carrier signal $V_p$ and the ramp signal $V_R$. The carrier signal $V_p$ is, for example, a sawtooth voltage that varies between +1 and −1 with a frequency for example equal to 15 kHz. The symbolic levels +1 and −1 of the carrier signal $V_p$ can correspond, in practice, to the respective voltage levels +5V and −5V. The voltage ramp signal $V_R$ is a decreasing signal of which the initial amplitude has a symbolic value equal to +1. In practice, the initial amplitude of the ramp signal corresponds to the maximum amplitude of the sawtooth signal, i.e., for example, +5V. FIG. 7c shows, in the same mark, the control signals Sa and $\overline{Sa}$ output by the block 8.

It appears in FIG. 7c that:
- during positive alternations of the voltage $V_a$, as soon as the amplitude of the carrier signal exceeds the value of the ramp voltage, the signal $\overline{Sa}$ is formed of a succession of rectangular pulses of which the width widens progressively while the signal Sa is at zero, and
- during negative alternations of the voltage Va, as soon as the amplitude of the carrier signal exceeds the value of the ramp voltage, the signal Sa is formed of a succession of rectangular pulses of which the width widens progressively while the signal $\overline{Sa}$ is at zero.

The truth table hereinbelow summarises the control logic of the arm which comprises the switches $Z_1$, $Z_2$:

|  | $V_a > 0$ | $V_a < 0$ |
|---|---|---|
| Amplitude of $V_R$ less than the amplitude of $V_P$ | $Z_1$ blocked $Z_2$ conductive | $Z_1$ conductive $Z_2$ blocked |
| Amplitude of $V_R$ greater than the amplitude of $V_P$ | $Z_2$ blocked $Z_1$ blocked | $Z_1$ blocked $Z_2$ blocked |

Figure 8A:
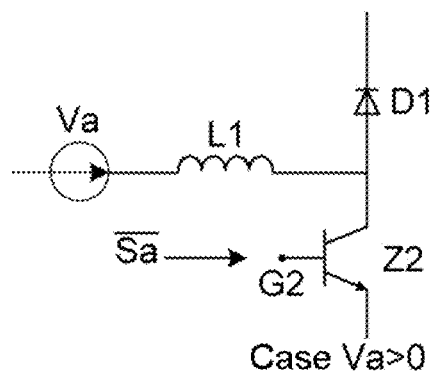
FIGS. 8a and 8b show the operation of the circuits of the AC/DC conversion device of the invention.
Figure 8B:
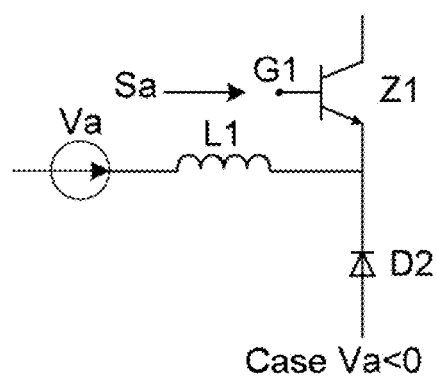

FIGS. 8a and 8b show the truth table mentioned hereinabove in reference to the circuit.

FIGS. 9a-9c show the operation of the AC/DC conversion device of the invention over all of the steps of operation, namely the pre-load step (I), the transition step (II) and the regulation step (III).

FIG. 9a shows the output voltage $V_{dc}$ of the AC/DC converter. FIG. 9b shows the current $IL_1$ that flows through the coil $L_1$ at the input of the converter and FIG. 9c shows the ramp signal $V_R$. For reasons of commodity, the currents $IL_2$ and $IL_3$ that flow through the respective coils $L_2$ and $L_3$ are not shown in FIGS. 9a-9c, with these currents having a variation that is similar to that of the current $IL_1$.

The inrush current $IL_1$ is zero at the moment when the AC/DC converter switches between the pre-load step (I) and the transition step (II). At the beginning of the transition step, the width of the rectangular pulses is low and the inrush currents are consequently of low amplitude. During the rest of the transition step, the width of the pulses increases with time and the inrush currents have an increasing amplitude. Likewise, the voltage $V_{dc}$ which is measured at the output of the converter increases (cf. FIG. 9a). During the transition step, the voltage $V_{dc}$ measured at the output of the converter is compared by the comparator 7 with a predetermined threshold value $V_f$ equal, for example, to 90% of the regulation direct voltage desired. As soon as the voltage $V_{dc}$ reaches the value $V_f$, the comparator 7 outputs a comparison signal which interrupts the transition step and triggers the regulation step.

The duration ΔT of the transition step is advantageously adjustable. An advantage of the adjustable nature of the duration ΔT is to be able to vary the duration of the time for the increase in the voltage $V_{dc}$. In FIGS. 9a-9c, it appears that this duration is, for example, equal to 80 ms.

Advantageously, the inrush currents $IL_i$ (i=1, 2, 3) have an amplitude that remains low all throughout the transition step and during the starting of the regulation step. By way of a non-restricted example, as shown in FIG. 9b, the value of the current $IL_1$ varies from substantially 0 A to substantially 40 A between the starting of the transition step and the starting of the regulation step.

What is claimed is:

1. Method for converting alternating current into direct current implemented by a conversion device that comprises a three-phase bridge able to convert into direct voltage ($V_{dc}$) at least one alternating input voltage ($V_a$, $V_b$, Vc), with the three-phase bridge comprising at least one arm comprised of a first switch ($Z_1$) and of a second switch ($Z_2$) mounted in series, with each switch having a control input able to control the opening or the closing of the switch, with the method comprising a step of regulating the direct voltage, and a transition step which precedes the regulation step, with the transition step comprising the formation, using the alternating input voltage ($V_a$, $V_b$, $V_c$), of a first signal applied to the control input of the first switch and of a second signal applied to the control input of the second switch in such a way that:
   a) during the negative alternations of the alternating input voltage, the first signal is a pulse signal of which the width of the successive pulses widens progressively as a function of time, which opens and closes the first switch ($Z_1$), and the second signal is a continuous signal that keeps the second switch open ($Z_2$), and
   b) during the positive alternations of the alternating input voltage, the first signal is a continuous signal that keeps open the first switch ($Z_1$) and the second signal is a pulse signal of which the width of the successive pulses widens progressively as a function of time, which opens and closes the second switch ($Z_2$),
   characterized in that the formation, using the alternating input voltage ($V_a$, $V_b$, $V_c$), of said first signal and of said second signal comprises:
      a generation of successive pulses of which the width widens progressively as a function of time,
      a formation, using the alternating input voltage, of a level 1 logic signal for the positive alternations of the alternating input voltage and of level 0 for the negative alternations of the alternating input voltage,
      an inversion of the logic signal in order to form an inverted logic signal,
      a formation of the first signal using a first logic AND circuit (14) which receives on a first input said pulses and on a second input the logic signal, and
      a formation of the second signal using a second logic AND circuit (15) that receives on a first input said pulses and on a second input the inverted logic signal.

2. Method for converting according to claim 1, wherein the transition step is interrupted and the regulation step starts as soon as the direct voltage ($V_{dc}$) reaches a predetermined threshold value ($V_f$).

3. Method for converting according to claim 2, wherein the predetermined voltage value ($V_f$) is 90% of a regulated direct voltage value.

4. Device for converting alternating current into direct current which comprises a three-phase bridge able to convert into direct voltage ($V_{dc}$) at least one alternating input voltage ($V_a$, $V_b$, $V_c$), with the three-phase bridge comprising at least one arm comprised of a first switch ($Z_1$) and a second switch ($Z_2$) mounted in series, with each switch having a control input able to control the opening or the closing of the switch, the device comprising a control circuit (6) which comprises means (9, 10, 11, 12, 13; 14, 15) able to output, using the alternating input voltage ($V_a$, $V_b$, $V_c$), a first signal applied to the control input of the first switch and a second signal applied to the control input of the second switch in such a way that:
   a) during the negative alternations of the alternating input voltage, the first signal is a pulse signal of which the width of the successive pulses widens progressively as a function of time, which opens and closes the first switch ($Z_1$), and the second signal is a continuous signal that keeps the second switch open ($Z_2$), and
   b) during the positive alternations of the alternating input voltage, the first signal is a continuous signal that keeps open the first switch ($Z_1$) and the second signal is a pulse signal of which the width of the successive pulses widens progressively as a function of time, which opens and closes the second switch ($Z_2$), characterized in that the means (9, 10, 11, 12, 13; 14, 15) able to output, using the alternating input voltage, a first signal and a second signal include:
      a pulse generator (9, 10, 11) having an output that outputs successive pulses of which the width widens progressively as a function of time, a logic circuit (12) that has an input and an output, which receives on its input the alternating input voltage and outputs on its output a level 1 logic signal for the positive alternations of the alternating input voltage and a level 0 signal for the negative alternations of the alternating input voltage, an inverter (13) that inverts the logic signal output by the logic circuit (12), a first AND logic circuit (14) that receives on a first input the signal output by the pulse generator (9, 10, 11) and on a second input the signal output by the logic circuit (12), with the output of the first logic AND circuit being connected to the control input of the second switch, and a second logic AND circuit (15) which receives on a first input the signal output by the pulse generator (9, 10, 11) and on a second input the signal output by the inverter (12), with the output of the second logic AND circuit being connected to the control input of the first switch.

5. Device according to claim 4, wherein the pulse generator (9, 10, 11) is a pulse width modulator that comprises a sawtooth signal generator (9), a ramp generator (10) and a comparator (11).

6. Device according to claim 4, wherein a comparison circuit (7) compares a measurement of the direct voltage ($V_{dc}$) to a predetermined voltage value ($V_f$) and outputs a control signal that interrupts the operation of the means able to output the first and the second signal (6) as soon as the measurement of the direct voltage reaches the predetermined voltage value.

* * * * *